US012783653B2

(12) United States Patent
Xiao et al.

(10) Patent No.: US 12,783,653 B2
(45) Date of Patent: Nov. 3, 2026

(54) VULNERABILITY ASSESSMENT METHOD AND ANALYSIS DEVICE

(71) Applicant: HUAWEI TECHNOLOGIES CO., LTD., Shenzhen (CN)

(72) Inventors: Xin Xiao, Nanjing (CN); Yuming Xie, Nanjing (CN); Yongsheng Deng, Nanjing (CN); Hengchen Yuan, Nanjing (CN); Jipeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 18/894,399

(22) Filed: Sep. 24, 2024

(65) Prior Publication Data

US 2025/0013744 A1 Jan. 9, 2025

Related U.S. Application Data

(63) Continuation of application No. PCT/CN2023/082091, filed on Mar. 17, 2023.

(30) Foreign Application Priority Data

Mar. 25, 2022 (CN) ......................... 202210301413.8

(51) Int. Cl.
*G06F 21/55* (2013.01)
*G06F 21/57* (2013.01)

(52) U.S. Cl.
CPC .......... *G06F 21/554* (2013.01); *G06F 21/577* (2013.01); *G06F 2221/034* (2013.01)

(58) Field of Classification Search
CPC ....... G06F 21/55; G06F 21/554; G06F 21/577
See application file for complete search history.

(56) References Cited

U.S. PATENT DOCUMENTS 10,931,706 B2 * 2/2021 Sant-Miller ......... H04L 63/1416
11,238,162 B1 * 2/2022 Shih ........................ G06F 16/22
(Continued)

FOREIGN PATENT DOCUMENTS

CN 101950338 A 1/2011
CN 102594607 A 7/2012
(Continued)

OTHER PUBLICATIONS

PCT International Search Report for Application No. PCT/CN2023/082091 dated Mar. 17, 2023, 8 pages.
(Continued)

*Primary Examiner* — Shanto Abedin

(57) ABSTRACT

The technology of this application relates to a vulnerability assessment method and an analysis device. The analysis device obtains a plurality of pieces of vulnerability information of a computer device. The vulnerability information includes an identifier of a vulnerability, and each piece of vulnerability information indicates one vulnerability on the computer device. A plurality of vulnerabilities indicated by the plurality of pieces of vulnerability information may be on one computer device or different computer devices. The analysis device assesses, based on information about a threat event that is reported by a security device and/or vulnerability exploitation difficulty, threat degrees of the plurality of vulnerabilities to the computer device.

20 Claims, 9 Drawing Sheets

| Computer device IP address | Name of a vulnerability | Information about a threat event | | | Vulnerability exploitation difficulty | | Level of a threat degree | Score of the threat degree | Fixing order |
|---|---|---|---|---|---|---|---|---|---|
| | | Type of the threat event | Quantity of times of the threat event | Level of the threat event | Quantity of exploitable samples | Code exploitation maturity | | | |
| 10.1.1.2 | CVE-A | Botnet, Trojan horse, and worm | 8 | 5 (major) | 10 | Functional (privilege escalation code can be compiled) | High | 90 | 1 |
| | CVE-B | Malicious file | 3 | 3 (minor) | 2 | Unproven (privilege escalation code is unlikely to be compiled) | Low | 50 | 3 |
| | CVE-C | Botnet, Trojan horse, and worm | 5 | 5 (major) | 3 | Functional (privilege escalation code can be compiled) | Medium | 75 | 2 |

(56) References Cited

U.S. PATENT DOCUMENTS

| | | | | |
|---|---|---|---|---|
| 11,528,293 | B2 * | 12/2022 | Joy | G06F 9/5044 |
| 11,621,975 | B2 * | 4/2023 | Ocepek | H04L 63/1433 726/25 |
| 11,757,907 | B1 * | 9/2023 | Berger | G06N 7/01 726/23 |
| 11,888,887 | B2 * | 1/2024 | Roytman | H04L 63/1466 |
| 11,902,316 | B2 * | 2/2024 | Berger | H04L 63/1433 |
| 12,182,270 | B2 * | 12/2024 | Koelemij | G06F 21/552 |
| 2010/0281248 | A1 * | 11/2010 | Lockhart | G06F 11/3612 713/150 |
| 2014/0189873 | A1 * | 7/2014 | Elder | H04L 63/1433 726/25 |
| 2018/0124094 | A1 * | 5/2018 | Hamdi | G06F 7/24 |
| 2018/0351987 | A1 * | 12/2018 | Patel | G06F 21/577 |
| 2020/0120126 | A1 * | 4/2020 | Ocepek | H04L 63/1433 |
| 2020/0210590 | A1 * | 7/2020 | Doyle | G06F 21/577 |
| 2022/0070185 | A1 * | 3/2022 | Yang | H04L 63/1408 |
| 2022/0070198 | A1 * | 3/2022 | Willis | H04L 63/1425 |
| 2022/0210200 | A1 * | 6/2022 | Crabtree | G06F 16/2477 |

FOREIGN PATENT DOCUMENTS

| | | | |
|---|---|---|---|
| CN | 106611126 | A | 5/2017 |
| CN | 110489970 | A | 11/2019 |
| CN | 111666573 | A | 9/2020 |

OTHER PUBLICATIONS

Extended European Search Report for EP Application No. 23773715.0 dated Nov. 25, 2024, 10 pages.

* cited by examiner

| | | |
|---|---|---|
| action | 1 | Attack action |
| application | Telnet | |
| attackIP | 10.0.0.0 | Attack source |
| condition | 3 | Handling status |
| destLocation | Specific city | |
| deviceId | a1-b2-c3-d4 | Device ID |
| disposer | HISTORY_DISPOSE | |
| domainID | 12345 | User ID |
| dstIP | 10.0.0.1 | Destination IP address |
| dstPort | 23 | Destination port |
| dstZone | trust | Destination security zone |
| ESN | 23456 | Device ESN |
| eventCount | 1 | Quantity of times of a threat event |
| eventID | 123 | ID of the threat event |
| eventName | Weak Telnet Password Login Detected | Name of the threat event |
| eventType | 1 | Type of the threat event |
| firstTime | 1633033818251 | Time when the threat event occurs for the first time |
| int_ai_recomm | 1 | |
| lastTime | 1633033818251 | Time when the threat event occurs at a latest time |
| modelDisposer | HISTORY_DISPOSE | |
| pcapList | 000000c | |
| policy | service_detect | Security policy |
| protocol | TCP | |
| severity | 5 | Level of the threat event |
| signatureID | 123456 | |
| srcIP | 10.0.0.2 | IP address of the attack source |
| srcLocation | Specific city | |
| srcPort | 45,488 | Port of the attack source |
| srcZone | trust | Security zone of the attack source |
| tenantID | 11111f5 | |
| tenantName | XXXX | |
| threatIP | 10.0.0.3 | Threat determining IP address |
| threatType | 1 | Threat determining |
| time_produce_time | 1633033818251 | Information generation time |
| CVE | CVE-2013-3612 | Name of a vulnerability |

FIG. 4

"vulId": "CVE-2021-36080", (name of a vulnerability)
"summary": "In ih264d_init_decoder of ih264d_api.c, there is a possible out of bounds write due to a use after free. This could lead to remote code execution with no additional execution privileges needed. User interaction is needed for exploitation Product: Android Versions: Android-8.0, Android-8.1, Android-9, and Android-10 Android ID: A-142602711", (vulnerability description information)
"cvss": 8.8, (CVSS score)
"publishDate": "2020-01-08 19:15", (vulnerability publish time)
"collectTime": "2021-07-30 12:26", (vulnerability collection time)
"severity": "critical|high|medium|low",/*CVSS 3.x Severity and Metrics:*/ (vulnerability severity obtained based on the CVSS score)
"attackVector": "Network", (attack vector, including: Network, Adjacent, Local, and Physical)
"attackComplexity": "Low", (attack complexity, including: Low and High)
"privilegesRequired": "Low", (permission requirement, including: None, Low, and High)
"userInteraction": "None", (user interaction, including: None and Required)
"scope": "Changed", (impact scope, including: Unchanged and Changed)
"confidentiality": "None", (confidentiality, including: None, Low, and High)
"integrity": "None", (integrity, including: None, Low, and High)
"availability": "None", (availability, including: None, Low, and High)
"exploitCodeMaturity": "Proof-of-Concept", (code exploitation maturity, including: Unproven, Proof-of-Concept, Functional, and High)
"exploitSample": 10 (quantity of exploitable samples)

FIG. 5

| Computer device IP address | Name of a vulnerability | Information about a threat event | | | Vulnerability exploitation difficulty | | Level of a threat degree | Score of the threat degree | Fixing order |
|---|---|---|---|---|---|---|---|---|---|
| | | Type of the threat event | Quantity of times of the threat event | Level of the threat event | Quantity of exploitable samples | Code exploitation maturity | | | |
| 10.1.1.2 | CVE-A | Botnet, Trojan horse, and worm | 8 | 5 (major) | 10 | Functional (privilege escalation code can be compiled) | High | 90 | 1 |
| | CVE-B | Malicious file | 3 | 3 (minor) | 2 | Unproven (privilege escalation code is unlikely to be compiled) | Low | 50 | 3 |
| | CVE-C | Botnet, Trojan horse, and worm | 5 | 5 (major) | 3 | Functional (privilege escalation code can be compiled) | Medium | 75 | 2 |

FIG. 6

| Computer device IP address | Name of a vulnerability | Vulnerability exploitation difficulty | | | Level of a threat degree | Score of the threat degree | Fixing order |
|---|---|---|---|---|---|---|---|
| | | Can a vulnerability be protected against | Quantity of exploitable samples | Code exploitation maturity | | | |
| 10.1.1.3 | CVE-E | No | 8 | Functional (privilege escalation code can be compiled) | High | 90 | 1 |
| | CVE-F | No | 3 | Functional (privilege escalation code can be compiled) | Medium | 75 | 2 |
| | CVE-G | Yes | 5 | Unproven (privilege escalation code is unlikely to be compiled) | Low | 50 | 3 |

FIG. 9

VULNERABILITY ASSESSMENT METHOD AND ANALYSIS DEVICE

CROSS-REFERENCE TO RELATED APPLICATIONS

This application is a continuation of International Application No. PCT/CN2023/082091, filed on Mar. 17, 2023, which claims priority to Chinese Patent Application No. 202210301413.8, filed on Mar. 25, 2022. The disclosures of the aforementioned applications are hereby incorporated by reference in their entireties.

TECHNICAL FIELD

This application relates to the field of network security technologies, and in particular, to a vulnerability assessment method and an analysis device.

BACKGROUND

Vulnerabilities are defects of a computer device in hardware, software, a system security policy, or the like. Attackers can access or damage the computer device without authorization by exploiting the vulnerability. A computer device usually has a large quantity of vulnerabilities, and threat degrees of the vulnerabilities to the computer device are different. To facilitate vulnerability handling, the threat degrees of the vulnerabilities need to be assessed.

According to most current assessment methods, a vulnerability is scored by using a common vulnerability scoring system (CVSS). A CVSS score of the vulnerability indicates a threat degree of the vulnerability. A higher CVSS score indicates a higher threat degree of the vulnerability. The CVSS is an open industry standard. A score of severity of the vulnerability is obtained with reference to an attack vector, complexity, confidentiality, integrity and other properties of the vulnerability.

However, the CVSS considers only inherent characteristics of the vulnerability. In this case, the threat degree of the vulnerability that is assessed using the CVSS is usually not accurate.

SUMMARY

This application provides a vulnerability assessment method and an analysis device, to improve accuracy of an assessment result when a threat degree of a vulnerability is assessed.

A first aspect of this application provides a vulnerability assessment method, applied to an analysis device. The analysis device obtains a plurality of pieces of vulnerability information of a computer device. For example, the analysis device scans the computer device to obtain the plurality of pieces of vulnerability information of the computer device. The vulnerability information includes an identifier (for example, a name) of a vulnerability. Each piece of vulnerability information indicates one vulnerability on the computer device. A plurality of vulnerabilities indicated by the plurality of pieces of vulnerability information may be on one computer device or different computer devices.

The analysis device receives information about a plurality of threat events that is sent by a security device. The security device may be a firewall, a honeypot, or another device that can provide a defense capability for the computer device. The threat event is an event, detected by a security device, of attacking the computer device by an attacker by exploiting the vulnerability of the computer device. There may be a plurality of types of the threat event, for example, a botnet, a Trojan horse, and a worm, and a malicious file. The type of the threat event indicates a type of an attack that causes the threat event. For example, if the type of the threat event is the botnet, the Trojan horse, and the worm, it indicates that the threat event is a threat event caused by an attack source using the botnet, the Trojan horse, and the worm to initiate an attack. For each type, the attacker may generate a plurality of attack samples, and each attack sample indicates to initiate an attack of a corresponding type to a determined attack target. The attacker may cause one threat event by executing one attack sample. The attacker may execute a same attack sample for a plurality of times, and a plurality of attack behaviors may cause a same threat event. A quantity of times of an attack is recorded in the information about the threat event. Certainly, alternatively, one attack behavior may cause one threat event, and a same attack sample may cause a plurality of threat events.

After receiving the information about the threat event, the analysis device assesses a threat degree of each vulnerability based on the information about the threat event. For example, the information about the threat event may include whether the vulnerability causes a threat event, a quantity of caused threat events, and a level of the caused threat event. The analysis device assesses the threat degree of the vulnerability based on the information about the threat event. More threat events are caused, the threat events are severer, and the threat degree of the vulnerability is higher.

Alternatively, the analysis device may assess a threat degree of each vulnerability based on vulnerability exploitation difficulty. The vulnerability exploitation difficulty is difficulty in attacking the computer device by the attacker by exploiting the vulnerability. The vulnerability exploitation difficulty is lower, the attacker may exploit the vulnerability to attack the computer device more easily, and the threat degree of the vulnerability is higher.

The analysis device may alternatively assess threat degrees of the plurality of vulnerabilities with reference to the information about the threat event that is sent by the security device and the vulnerability exploitation difficulty.

In this solution, the analysis device may assess the threat degree of the vulnerability on the computer device based on the information about the threat event related to the vulnerability and/or the vulnerability exploitation difficulty. The information about the threat event related to the vulnerability reflects a threat that the vulnerability has brought to the computer device, and the vulnerability exploitation difficulty reflects the difficulty in attacking the computer device by the attacker based on the vulnerability. In other words, in this solution, the threat degree of the vulnerability is assessed based on the threat that the vulnerability brings to the computer device, the difficulty in attacking the computer device by the attacker based on the vulnerability, and a specific status of the vulnerability, so that accuracy of an assessment result can be improved.

In a possible implementation of the first aspect, after assessing the threat degrees of the plurality of vulnerabilities, the analysis device may determine fixing orders of the plurality of vulnerabilities based on the threat degrees. In this possible implementation, after obtaining the threat degrees of the plurality of vulnerabilities, the analysis device may rank the fixing orders of the plurality of vulnerabilities based on the threat degrees, so that a security operation person first fixes a high-risk vulnerability, to ensure stable running of the computer device to the fullest extent.

In a possible implementation of the first aspect, after assessing the threat degrees of the plurality of vulnerabilities, the analysis device may determine handling priorities of the plurality of vulnerabilities based on the threat degrees. Specifically, a vulnerability with a high threat degree poses a great threat to the computer device, and is more likely to affect secure running of the computer device, so that fixing needs to be performed first. Therefore, the vulnerability with the high threat degree has a high handling priority, and a vulnerability with a low threat degree has a low handling priority.

After determining the handling priorities of the plurality of vulnerabilities, the analysis device may determine the fixing orders of the vulnerabilities based on the handling priorities, in other words, a fixing order of a vulnerability with the high handling priority ranks the top, and a fixing order of a vulnerability with the low handling priority ranks the bottom. For example, if a threat degree of a vulnerability A is high, a threat degree of a vulnerability B is low, and a threat degree of a vulnerability C is medium, a handling priority of the vulnerability A is high, a handling priority of the vulnerability C is medium, and a handling priority of the vulnerability B is low. Then the analysis device ranks fixing orders of the vulnerabilities based on the handling priorities, to be specific, the vulnerability A ranks the first, the vulnerability C ranks the second, and the vulnerability B ranks the third.

In this possible implementation, the analysis device may first determine the handling priorities of the vulnerabilities based on the threat degrees of the vulnerabilities, and then rank the fixing orders of the vulnerabilities based on the handling priorities, so that accuracy of the fixing orders of the vulnerabilities is improved.

In a possible implementation of the first aspect, the vulnerability exploitation difficulty includes code exploitation maturity. The code exploitation maturity represents whether there has been a code script for an attack exploiting a vulnerability, a quantity of code scripts, and quality of the code script. More quantity and higher quality indicate higher code exploitation maturity. In other words, higher code exploitation maturity indicates lower costs for the attacker to exploit the vulnerability to attack, that is, lower vulnerability exploitation difficulty, and a higher threat degree of the vulnerability.

The vulnerability exploitation difficulty may further include defense effectiveness of the computer device against the vulnerability. If an attack initiated by the attacker by exploiting a vulnerability can be effectively defended by the computer device, it indicates that defense effectiveness of the computer device against the vulnerability is high. In other words, it is difficult for the attacker to attack by exploiting the vulnerability (that is, the vulnerability exploitation difficulty is high), and a threat degree of the vulnerability to the computer device is low.

In addition, the vulnerability exploitation difficulty may further include a quantity of exploitable samples. The quantity of exploitable samples is a quantity of malicious code families for a vulnerability. Each malicious code family may cause a threat event. A larger quantity of exploitable samples indicates lower vulnerability exploitation difficulty and a higher threat degree of the vulnerability.

In a possible implementation of the first aspect, the analysis device may obtain the defense effectiveness of the computer device against the vulnerability by sending a test task to the computer device. Specifically, the test task is an attack simulation initiated by the analysis device to the computer device based on the vulnerability information. The computer device generates an attack result (namely, a test result) based on the attack simulation, and the analysis device may learn, based on the attack result returned by the computer device, whether the attack simulation is successful, in other words, whether the computer device successfully defends against the attack simulation. If the computer device fails to perform defense successfully, it indicates that the computer device has a weak defense capability against the vulnerability corresponding to the test task, in other words, it is not difficult for the attacker to attack the computer device by exploiting the vulnerability (the vulnerability exploitation difficulty is low), and a threat degree of the vulnerability is high.

Optionally, the analysis device may alternatively send the test task to enable the computer device to perform the attack simulation, in other words, the analysis device does not initiate the attack simulation. For example, an agent is installed on the computer device, the analysis device indicates, by sending the test task, the agent to perform a corresponding attack action, and then the computer device sends the attack result to the analysis device, to test the defense effectiveness of the computer device against the vulnerability.

In this possible implementation, the defense effectiveness of the computer device against the vulnerability may be obtained by sending the test task to the computer device, so that implementability of the solution is improved.

In a possible implementation of the first aspect, after obtaining the information about the threat event caused by the vulnerabilities and/or the vulnerability exploitation difficulty, the analysis device may input the information about the threat event and/or the vulnerability exploitation difficulty into a vulnerability assessment model, to obtain the threat degree of the vulnerability. The vulnerability assessment model is obtained by the analysis device by training an artificial intelligence (AI) model based on a plurality of training samples. Each training sample corresponds to one vulnerability, and the training sample includes an input feature of the vulnerability assessment model: the information about the threat event caused by the vulnerability and/or the vulnerability exploitation difficulty of the vulnerability, and an output result (that is, a label of the training sample) of the vulnerability assessment model: the threat degree of the vulnerability.

In this possible implementation, after obtaining related information about the vulnerability, the analysis device may assess the threat degree of the vulnerability by using the trained vulnerability assessment model. In comparison with a manner of assessing the threat degree of the vulnerability based on expert experience, this implementation is not limited to an expert level, and improves the accuracy of the assessment result.

In a possible implementation of the first aspect, after obtaining the plurality of pieces of vulnerability information and assessing the threat degrees of the plurality of vulnerabilities, the analysis device may display the vulnerabilities and the threat degrees of the vulnerabilities in a form of a table, a text, a graph, or the like on a frontend interface, so that the security operation person can quickly learn of a risk status of each vulnerability. In addition, the analysis device may further display information about a vulnerability in different dimensions based on a user requirement, for example, whether the vulnerability causes a threat event, a quantity of caused threat events and a level of the caused threat event, whether the vulnerability can be defended by the computer device, a standard score of the vulnerability, and a quantity of exploitable samples.

In this possible implementation, the analysis device may display the vulnerabilities and the threat degrees of the vulnerabilities in the form of the table, the text, the graph, or the like on the frontend interface. The security operation person can quickly and accurately learn of a vulnerability status through information displayed on the frontend interface, to quickly perform handling.

In a possible implementation of the first aspect, the analysis device may further display the fixing orders of the plurality of vulnerabilities through the frontend interface, to help the security operation person fix the vulnerabilities.

In this possible implementation, the analysis device further displays the fixing orders of the plurality of vulnerabilities on the frontend interface, so that the security operation person can clearly know which vulnerability need to be first handled.

A second aspect of this application provides an analysis device, including an obtaining unit and an assessment unit.

The obtaining unit is configured to obtain a plurality of pieces of vulnerability information. Each piece of vulnerability information in the plurality of pieces of vulnerability information indicates one vulnerability on a computer device, and each piece of vulnerability information includes an identifier of a vulnerability.

The assessment unit is configured to assess, based on a quantity of threat events that cause an alarm of a security device and/or vulnerability exploitation difficulty, threat degrees of a plurality of vulnerabilities indicated by the plurality of pieces of vulnerability information. The threat event is generated by the security device for an attack sample.

In a possible implementation of the second aspect, the analysis device further includes a determining unit. The determining unit is configured to determine, fixing orders of the plurality of vulnerabilities based on the threat degrees of the plurality of vulnerabilities.

In a possible implementation of the second aspect, the determining unit is specifically configured to determine handling priorities of the plurality of vulnerabilities based on the threat degrees of the plurality of vulnerabilities, and determine the fixing orders of the plurality of vulnerabilities based on the handling priorities of the plurality of vulnerabilities.

In a possible implementation of the second aspect, the vulnerability exploitation difficulty includes code exploitation maturity or defense effectiveness of the computer device against the vulnerability.

In a possible implementation of the second aspect, the analysis device further includes a sending unit and a receiving unit.

The sending unit is configured to send a test task to the computer device, where the test task is for testing the defense effectiveness of the computer device against the vulnerability.

The receiving unit is configured to receive a test result that is of the test task and that is sent by the computer device, where the test result indicates the defense effectiveness of the computer device against the vulnerability.

In a possible implementation of the second aspect, the assessment unit is further configured to assess the threat degrees of the plurality of vulnerabilities based on a vulnerability assessment model. The vulnerability assessment model is obtained through training based on a plurality of training samples, and a first training sample in the plurality of training samples includes a quantity of attack samples that cause the alarm of the security device by exploiting a first vulnerability and/or first vulnerability exploitation difficulty, and a threat degree of the first vulnerability.

In a possible implementation of the second aspect, the analysis device further includes a display unit that is configured to display the plurality of vulnerabilities and the threat degrees of the plurality of vulnerabilities.

In a possible implementation of the second aspect, the display unit is further configured to display the fixing orders of the plurality of vulnerabilities.

The analysis device provided in the second aspect of this application is configured to perform the method in any one of the first aspect or the possible implementations of the first aspect.

A third aspect of this application provides an analysis device, including a processor and a memory. The memory is configured to store instructions, and the processor is configured to obtain the instructions stored in the memory, to perform the method in any one of the first aspect or the implementations of the first aspect.

A fourth aspect of this application provides a computer-readable and writable storage medium. The computer-readable and writable storage medium stores instructions. When the instructions are run on a computer, the computer is enabled to perform the method in any one of the first aspect or the possible implementations of the first aspect.

A fifth aspect of this application provides a computer program product. The computer program product includes instructions. When the computer program product runs on a computer, the computer is enabled to perform the method in any one of the first aspect or the possible implementations of the first aspect.

A sixth aspect of this application provides a chip system, where the chip system includes at least one processor and a communication interface. The communication interface and the at least one processor are interconnected through a cable, and the at least one processor is configured to run a computer program or instructions, to perform the method in any one of the first aspect or the possible implementations of the first aspect.

BRIEF DESCRIPTION OF DRAWINGS

FIG. 4 is a schematic diagram of information about a threat event according to an example embodiment of this application;

FIG. 5 is a schematic diagram of vulnerability information in a vulnerability knowledge base according to an example embodiment of this application;

FIG. 6 is a schematic diagram of vulnerability information displayed on a frontend interface according to an example embodiment of this application;

FIG. 9 is another schematic diagram of vulnerability information displayed on a frontend interface according to an example embodiment of this application;

DESCRIPTION OF EMBODIMENTS

Embodiments of this application provides a vulnerability assessment method and an analysis device, to improve accuracy of an assessment result when a threat degree of a vulnerability is assessed. Embodiments of this application further provide a corresponding computer-readable storage medium, a computer program product, and the like. The following provides detailed descriptions.

The following describes embodiments of this application with reference to accompanying drawings. It is clear that, the described embodiments are merely a part rather than all of embodiments of this application. A person of ordinary skill in the art may know that with development of technologies and emergence of new scenarios, the technical solutions provided in embodiments of this application are also applicable to resolving similar technical problems.

In the specification, claims, and the accompanying drawings of this application, the terms "first", "second", and so on are intended to distinguish between similar objects but do not necessarily indicate a specific order or sequence. It should be understood that data termed in such a way is interchangeable in a proper circumstance, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
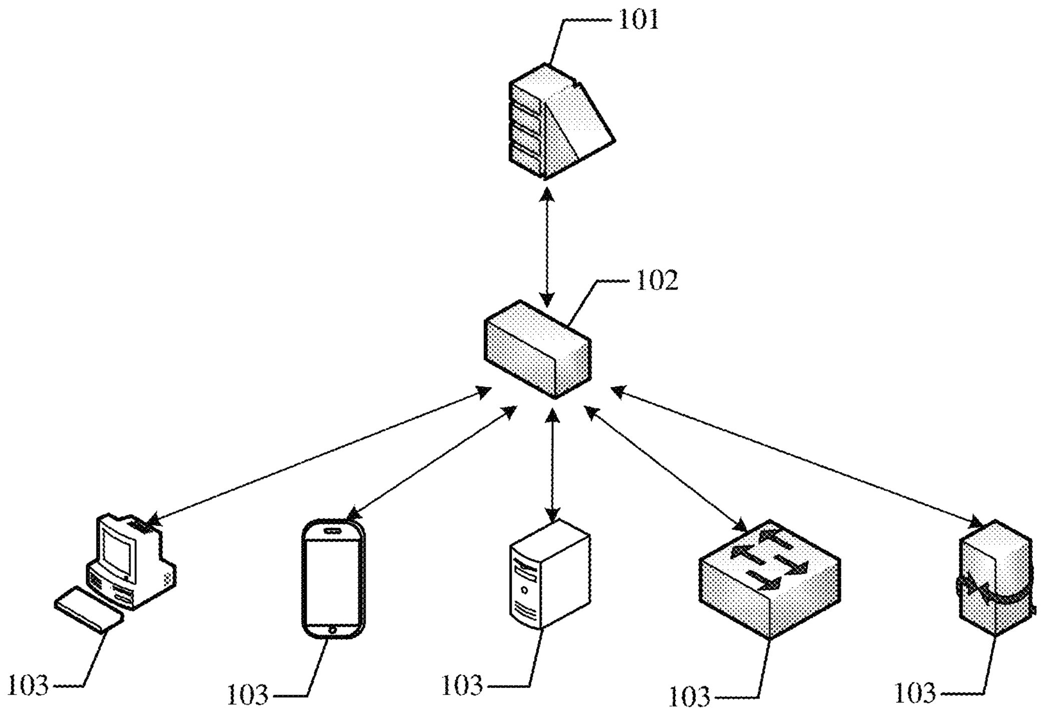
FIG. 1 is a schematic diagram of an application scenario of a vulnerability assessment system according to an example embodiment of this application.

FIG. 1 is a schematic diagram of an application scenario of a vulnerability assessment system according to an embodiment of this application.

The vulnerability assessment system in this embodiment of this application includes an analysis device 101, a security device 102, and a plurality of computer devices 103. It may be understood that FIG. 1 is merely an example. During actual application, there may be a plurality of analysis devices 101 and security devices 102, and there may be more or fewer computer devices 103. This is not specifically limited herein.

The analysis device 101 is connected to the computer device 103 via the security device 102. The security device 102 provides a defense capability for the computer device 103, and can detect an event that causes a threat to the computer device 103. The security device 102 may be a device such as a firewall, a honeypot, or a security gateway. The computer device 103 may be a terminal device, for example, a server, a personal computer, or a mobile phone, or may be a network device, for example, a switch, a router, or a gateway. A communication connection is established between the analysis device 101, the security device 102, and the computer device 103 over a local area network or the internet. The communication connection may be a wired network connection, and a wired network is, for example, an Ethernet network or a fiber optic network. The communication connection may alternatively be a wireless network connection, and a wireless network is, for example, a wireless local area network (WLAN) or a cellular wireless network.

Alternatively, the analysis device 101 may be directly connected to the computer device 103 not via the security device 102. Alternatively, there may be no security device 102, and a function of the security device 102 is implemented by using software installed on the computer device.

After establishing the communication connection to the computer device 103, the analysis device 101 may obtain vulnerability information of the computer device 103, and assess a threat degree of a vulnerability indicated by the vulnerability information.

Figure 2:
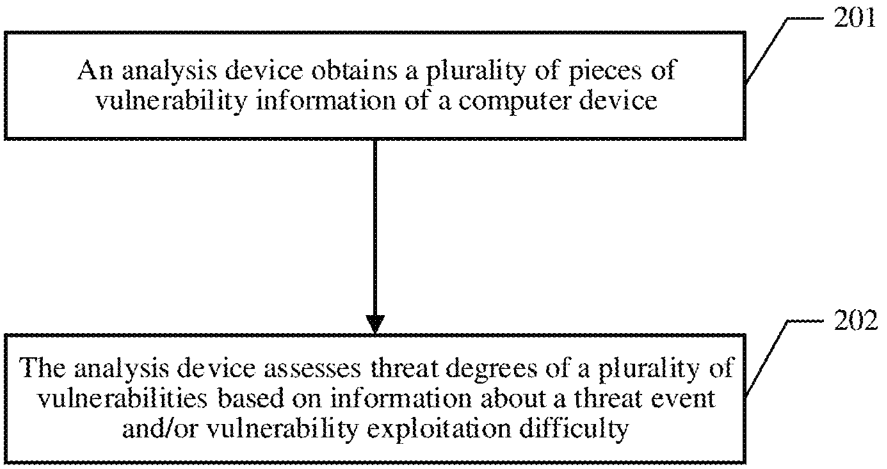
FIG. 2 is a schematic diagram of an embodiment of a vulnerability assessment method according to an example embodiment of this application.

Based on the vulnerability assessment system shown in FIG. 1, the following describes, with reference to FIG. 2, a vulnerability assessment method provided in embodiments of this application.

As shown in FIG. 2, an embodiment of a vulnerability assessment method in embodiments of this application includes step 201 and step 202.

201: An analysis device obtains a plurality of pieces of vulnerability information of a computer device.

The analysis device obtains the plurality of pieces of vulnerability information of the computer device. For example, the analysis device scans the computer device to obtain the plurality of pieces of vulnerability information of the computer device. The vulnerability information includes an identifier (for example, a name) of a vulnerability. Each piece of vulnerability information indicates one vulnerability on the computer device. A plurality of vulnerabilities indicated by the plurality of pieces of vulnerability information may be on one computer device or different computer devices.

In addition to the vulnerability information, the analysis device may further obtain information about the computer device, for example, an internet protocol (IP) address of the computer device.

It may be understood that the vulnerability information may alternatively be obtained by scanning the computer device by a vulnerability scanner or another device having a vulnerability scanning capability, and then sent to the analysis device. A manner in which the analysis device obtains the vulnerability information is not limited herein.

202: The analysis device assesses threat degrees of the plurality of vulnerabilities based on information about a threat event and/or vulnerability exploitation difficulty.

The threat event is an event, detected by a security device, of attacking the computer device by an attacker by exploiting the vulnerability of the computer device. There may be a plurality of types of the threat event, for example, a botnet, a Trojan horse, and a worm, and a malicious file. The type of the threat event indicates a type of an attack that causes the threat event. For example, if the type of the threat event is the botnet, the Trojan horse, and the worm, it indicates that the threat event is a threat event caused by an attack source using the botnet, the Trojan horse, and the worm to initiate an attack. For each type, the attacker may generate a plurality of attack samples, and each attack sample indicates to initiate an attack of a corresponding type to a determined attack target. The attacker may cause one threat event by executing one attack sample. The attacker may execute a same attack sample for a plurality of times, and a plurality of attack behaviors may cause a same threat event. A quantity of times of an attack may be recorded in the information about the threat event. Certainly, alternatively, one attack behavior may cause one threat event, and a same attack sample may cause a plurality of threat events. In this embodiment of this application, an example in which one attack sample corresponds to one threat event is used for description. This is not specifically limited herein.

After detecting the threat event, the security device sends the information about the threat event to the analysis device. Correspondingly, the analysis device receives the information about the threat event that is sent by the security device. After receiving the information about the threat event, the analysis device assesses a threat degree of each vulnerability based on the information about the threat event. Specifically, the analysis device assesses the threat degree of the vulnerability depending on whether the vulnerability causes a threat event, a quantity of caused threat events, and a level of the caused threat event. More threat events are caused, the threat events are severer, and the threat degree of the vulnerability is higher. For example, if a vulnerability A causes five threat events and levels of the five threat events are all high, a threat degree of the vulnerability A is high. If a vulnerability B causes one threat event and a level of the threat event is low, a threat degree of the vulnerability B is low.

Alternatively, the analysis device may assess a threat degree of each vulnerability based on vulnerability exploitation difficulty. The vulnerability exploitation difficulty is difficulty in attacking the computer device by the attacker by exploiting the vulnerability. The vulnerability exploitation difficulty includes defense effectiveness of the computer device against the vulnerability or code exploitation maturity. The vulnerability exploitation difficulty may further include a quantity of exploitable samples, or the like.

The analysis device may obtain the defense effectiveness of the computer device against the vulnerability by initiating an attack simulation on the computer device. Specifically, if an attack simulation initiated by exploiting a vulnerability can be effectively defended by the computer device, it indicates that the computer device has a defense capability against the vulnerability. In other words, it is difficult for the attacker to attack by exploiting the vulnerability (the vulnerability exploitation difficulty is high), and a threat degree of the vulnerability to the computer device is low. Certainly, in addition to initiating a corresponding attack simulation on the computer device based on one or more vulnerabilities, the analysis device may also perform in-depth and comprehensive detection on the computer device by using some test cases. For example, the analysis device performs a penetration test on the computer device, to learn of a vulnerability that the computer device can defend against and a vulnerability that the computer device cannot defend against.

The analysis device may obtain the code exploitation maturity and the quantity of exploitable samples from a vulnerability knowledge base. The vulnerability knowledge base is an information library that stores the vulnerability information and stores a large amount of information about released vulnerabilities. The code exploitation maturity represents whether there has been a code script for an attack exploiting a vulnerability, a quantity of code scripts, and quality of the code script. More quantity and higher quality indicate higher code exploitation maturity. In other words, higher code exploitation maturity indicates lower costs for the attacker to exploit the vulnerability to attack, that is, a higher threat degree of the vulnerability. The quantity of exploitable samples is a quantity of malicious code families for a vulnerability. The quantity of malicious code families is related to a quantity of attack samples. Each malicious code family may cause an attack sample. A larger quantity of exploitable samples indicates lower vulnerability exploitation difficulty and a higher threat degree of the vulnerability. It should be noted that, a quantity of exploitable samples of a vulnerability is a quantity of threat events that may be caused by the vulnerability in theory. However, in practice, the attacker usually does not use all malicious code, in other words, a quantity of threat events detected by the security device is not necessarily the same as the quantity of exploitable samples.

It may be understood that the analysis device may alternatively assess the threat degrees of the plurality of vulnerabilities with reference to the information about the threat event that is sent by the security device and the vulnerability exploitation difficulty. For example, neither the vulnerability A nor the vulnerability B causes a threat event. In this case, a threat degree of the vulnerability A and a threat degree of the vulnerability B may be assessed based on the vulnerability exploitation difficulty. Alternatively, the analysis device has assessed the threat degree of the vulnerability A and the threat degree of the vulnerability B based on the information about the threat event. In this case, the analysis device may further perform assessment with reference to the vulnerability exploitation difficulty, to improve accuracy of an assessment result.

Optionally, the analysis device may further assess the threat degree of the vulnerability with reference to information in another dimension such as a standard score (for example, a CVSS score) of the vulnerability. For example, if the analysis device learns, based on the information about the threat event and the vulnerability exploitation difficulty, that the threat degree of the vulnerability A is low, but a CVSS score of the vulnerability A is 8 (indicating a high risk), the threat degree of the vulnerability A is raised to medium.

The information about the threat event related to the vulnerability reflects a threat that the vulnerability has brought to the computer device, and the vulnerability exploitation difficulty reflects difficulty in attacking the computer device by the attacker based on the vulnerability. Therefore, in this embodiment, the analysis device assesses the threat degree of the vulnerability on the computer device based on the information about the threat event related to the vulnerability (for example, whether the vulnerability causes a threat event, the quantity of threat events, and the level) and/or the vulnerability exploitation difficulty (for example, the defense effectiveness of the computer device against the vulnerability, the code exploitation maturity, and the quantity of exploitable samples), to improve the accuracy of the assessment result.

In embodiments of this application, an analysis device may assess a threat degree of a vulnerability by using a plurality of methods, which are respectively described below.

1. Assess the Threat Degree of the Vulnerability Based on Information about a Threat Event that is Sent by a Security Device In this embodiment, the analysis device assesses the threat degree of the vulnerability based on the information about the threat event and vulnerability information obtained from a vulnerability knowledge base. The following provides descriptions with reference to FIG. 3.

301: The analysis device obtains a plurality of pieces of vulnerability information of a computer device.

The analysis device may include a vulnerability priority handling module. The analysis device scans the computer device by using the vulnerability priority handling module, and obtains the plurality of pieces of vulnerability information of the computer device. The vulnerability information includes an identifier (for example, a name) of a vulnerability, for example, "CVE-2020-13645". Each piece of vulnerability information indicates one vulnerability on the computer device, and a plurality of vulnerabilities indicated by the plurality of pieces of vulnerability information may be on one computer device or different computer devices.

In addition to the vulnerability information, the analysis device may further obtain information about the computer device, for example, an IP address of the computer device.

It may be understood that the vulnerability information may alternatively be obtained by scanning the computer device by a vulnerability scanner or another device having a vulnerability scanning capability, and then sent to the analysis device. A manner in which the analysis device obtains the vulnerability information is not limited herein.

302: The security device performs detection on the threat event on the computer device.

The security device has a defense capability and can detect the threat event that causes a threat to the computer device. The security device may be a device such as a firewall, a honeypot, or a security gateway. The threat event is an event of attacking the computer device by an attacker by exploiting the vulnerability of the computer device.

After detecting the threat event, the security device may obtain the information about the threat event. For example, as shown in FIG. 4, information about a threat event includes a name of a vulnerability exploited by the threat event: "CVE: CVE-2013-3612", a name of the threat event: "eventName: Weak Telnet Password Login Detected", a type of the threat event: "eventType: 1 (for example, 1 indicates a botnet, a Trojan horse, and a worm)", a quantity of times of occurrences of the threat event: "eventCount: 1", a level of the threat event: "severity: 5 (for example, 5 indicates major)", a security zone and an IP address of an attack source, a source port, a security zone (destination security zone) and an IP address (destination IP) of the attacked, a destination port, occurrence time, and the like. The security zone of the attack source represents that the attacker is in a trusted zone (for example, an intranet) or an untrusted zone, the IP address of the attack source is for identifying the attacker, the source port represents a port from which an attack is initiated, the destination security zone represents that the attacked is in the trusted zone or the untrusted zone, the destination IP address and the destination port represent an address and a port of the attacked, and the occurrence time may be time when the attacker attacks to cause the threat event for the first time, or may be time when the attacker attacks at a latest time.

It may be understood that step 302 may occur before step 301, or may occur after step 301. This is not specifically limited herein.

303: The security device sends the information about the threat event to the analysis device.

After obtaining the information about the threat event, the security device sends the information about the threat event to the analysis device. The analysis device may further include a border protection and response module. The border protection and response module sends, to the vulnerability priority handling module, information such as the vulnerability information used by the threat event, a type, a level, and a quantity of times of occurrences of the threat event.

304: The analysis device obtains information about the plurality of vulnerabilities from the vulnerability knowledge base.

The vulnerability knowledge base stores a large amount of information about released vulnerabilities. The vulnerability knowledge base may be stored in the analysis device or another device. After obtaining the plurality of pieces of vulnerability information of the computer device, the analysis device obtains, from the vulnerability knowledge base, exploitation difficulty of the plurality of vulnerabilities indicated by the plurality of pieces of vulnerability information, for example, code exploitation maturity and a quantity of exploitable samples.

The code exploitation maturity represents whether there has been a code script for an attack exploiting a vulnerability, a quantity of code scripts, and quality of the code script. More quantity and higher quality indicate higher code exploitation maturity. In other words, higher code exploitation maturity indicates lower costs for the attacker to exploit the vulnerability to attack, that is, lower vulnerability exploitation difficulty, and a higher threat degree of the vulnerability.

The quantity of exploitable samples is a quantity of malicious code families for a vulnerability. The quantity of malicious code families is related to a quantity of attack samples. Each malicious code family may cause an attack sample. A larger quantity of exploitable samples indicates lower vulnerability exploitation difficulty and a higher threat degree of the vulnerability.

In addition to the vulnerability exploitation difficulty, the vulnerability information obtained by the analysis device from the vulnerability knowledge base may further include information in another dimension such as a standard score (for example, a CVSS score) of the vulnerability. For details, refer to FIG. 5.

305: The analysis device assesses threat degrees of the plurality of vulnerabilities.

The analysis device assesses the threat degrees of the plurality of vulnerabilities with reference to the information about the threat event that is sent by the security device and the vulnerability exploitation difficulty obtained from the vulnerability knowledge base. Specifically, the analysis device may rate or score the threat degrees of the vulnerabilities with reference to the obtained information according to a scoring rule. The scoring rule may be generated based on expert experience. For example, if a vulnerability A causes threat events, and a quantity of the caused threat events is 5, the quantity exceeds a preset threshold 3, and 30 points are added. If a level of the threat event is major, another 30 points are added. If code exploitation maturity of the vulnerability A is low, 20 points are deducted. If a quantity of exploitable samples is 10, the quantity exceeds the preset threshold 3, and 20 points are added. That is, a threat degree score of the vulnerability A is 60 points. After obtaining a threat degree score of the vulnerability, the analysis device may further convert the threat degree score into a threat degree level. For example, if the scoring rule specifies that 50 to 70 points correspond to medium, a threat degree level of the vulnerability A is medium.

In addition, the analysis device may further increase or decrease the threat degree score based on information in another dimension such as a standard score obtained from the vulnerability knowledge base.

In addition to performing assessment according to the scoring rule, the analysis device may alternatively assess the threat degree of the vulnerability by inputting the obtained information into a trained vulnerability assessment model.

The vulnerability assessment model is obtained by the analysis device by training an AI model based on a plurality of training samples. Each training sample corresponds to one vulnerability, and the training sample includes an input feature of the vulnerability assessment model: the information about the threat event caused by the vulnerability and/or the vulnerability exploitation difficulty, and an output result (that is, a label of the training sample) of the vulnerability assessment model: the threat degree of the vulnerability.

For the input feature (to be specific, the information about the threat event and/or the vulnerability exploitation difficulty) in the training sample, the analysis device may perform quantization and rating based on the expert experience, and convert a value into an interval level. For example, if a vulnerability causes five threat events, a risk level of the vulnerability in a dimension of a quantity of threat events is medium. If 10 threat events are caused, the risk level is high. Similar processing may also be performed on features in other dimensions (such as the level of the threat event and the code exploitation maturity). The analysis device assesses the threat degree of the vulnerability with reference to the expert experience based on a feature of each dimension that is obtained through the quantization and rating, to obtain the threat degree of the vulnerability (that is, the label of the training sample). Specifically, the threat degree may be a level, for example, high, medium, low, or no threat, or may be a score. Certainly, the input feature may alternatively not be converted into the interval level. The analysis device directly assesses the vulnerability based on a score of the feature in each dimension and with reference to the scoring rule, to obtain the output result (the threat degree of the vulnerability) in the training sample.

After obtaining the training sample, the analysis device inputs the training sample into the AI model for training. The AI model may be a decision tree, a random forest, a gradient boosting decision tree (GBDT), an optimized distributed gradient boosting library (XGBoost), a Bayesian network, a kernel-based algorithm (for example, a support vector machine (SVM)), a restricted Boltzmann machine (RBM), a stacked auto-encoder, a deep neural network (DNN), a convolutional neural network (CNN), ensemble learning, or the like. This is not specifically limited herein.

During model training, the analysis device sets some parameters. For example, for a decision tree model, the analysis device may set a segmentation quality assessment (for example, a mean square error (MSE)), a segmentation policy of each node (for example, random segmentation or optimal segmentation), a maximum depth of the decision tree, a minimum quantity of samples of a leaf node, and the like. After the parameters are set, the vulnerability assessment model that meets a requirement and has high segmentation quality is trained based on the input training sample.

After obtaining the vulnerability assessment model, the analysis device inputs, into the vulnerability assessment model, the obtained information related to the vulnerability, and the vulnerability assessment model outputs the threat degree of the vulnerability. The output threat degree may be a level or a score. Specifically, during training of the vulnerability assessment model, if the label of the training sample is a threat degree level of the vulnerability, a result output after the model is trained is also the threat degree level; or if the label of the training sample is a threat degree score of the vulnerability, a result output after the model is trained is also the threat degree score. The threat degree level and the threat degree score that are output by the vulnerability assessment model may be mutually converted. A conversion manner may be setting a correspondence between a level and a score interval.

306: The analysis device determines fixing orders of the plurality of vulnerabilities.

After obtaining the threat degrees of the plurality of vulnerabilities, the analysis device may further determine the fixing orders of the vulnerabilities based on the threat degrees of the vulnerabilities, so that a security operation person can fix the vulnerabilities. Specifically, the analysis device ranks the fixing orders of the vulnerabilities based on high or low threat degrees of the vulnerabilities. A vulnerability with a high threat degree needs to be handled first and a fixing order ranks the top, and a fixing order of a vulnerability with a low threat degree ranks the bottom. For example, if a threat degree of the vulnerability A is high, a threat degree of the vulnerability B is low, and a threat degree of a vulnerability C is medium, fixing orders are that the vulnerability A ranks the first, the vulnerability C ranks the second, and the vulnerability B ranks the third.

307: The analysis device displays related information about the vulnerability on a frontend interface.

The analysis device further provides the frontend interface, and the analysis device may display the related information about the vulnerability in a form of a table, a text, or a graph on the frontend interface. The displayed information is shown in FIG. 6. In FIG. 6, an example in which each vulnerability only causes one threat event is used for description. During actual application, one vulnerability may cause a plurality of threat events, and a quantity of threat events may also be displayed on the frontend interface. When one vulnerability causes a plurality of threat events, a quantity of times of occurrences and a level of each threat event are displayed separately.

It may be understood that FIG. 6 is merely an example. During actual application, the frontend interface may display only the vulnerability and a threat degree of the vulnerability (the threat degree may be a score or a level), or may display only the vulnerability, the threat degree of the vulnerability, and a fixing order of the vulnerability, or may display information about features in various dimensions of the vulnerability as shown in FIG. 6, including information about the threat event (for example, whether a threat event is caused, a type and a level of the threat event, and a quantity of threat events), and related information (for example, code exploitation maturity and a quantity of exploitable samples) about the vulnerability exploitation difficulty that is obtained from the vulnerability knowledge base. This is not specifically limited herein.

The foregoing step 304 is optional. The analysis device may not obtain other information about the vulnerability from the vulnerability information base, but only assess the threat degree of the vulnerability based on the information about the threat event. When the analysis device performs step 304, the analysis device assesses the threat degree of the vulnerability based on the information about the threat event and the vulnerability exploitation difficulty.

In this embodiment, the analysis device may assess the threat degrees of the plurality of vulnerabilities with reference to the information about the threat event that is reported by the security device and/or the vulnerability exploitation difficulty, so that accuracy of an assessment result is improved. In addition, the analysis device may further rank the fixing orders of the plurality of vulnerabilities based on the threat degrees of the plurality of vulnerabilities, so that the security operation person can subsequently fix the vulnerabilities. The analysis device may further display the fixing orders and other related information about the vulnerability on the frontend interface, so that the security operation person can accurately and comprehensively learn of a status of the vulnerability, to ensure stable running of the computer device to the fullest extent.

2. Assess the Threat Degree of the Vulnerability Based on Defense Effectiveness of a Computer Device Against the Vulnerability Vulnerability exploitation difficulty may alternatively be the defense effectiveness of the computer device against the vulnerability. In this embodiment, the analysis device assesses the threat degree of the vulnerability based on the defense effectiveness of the computer device against the vulnerability. The following provides descriptions with reference to FIG. 7.

701: The analysis device obtains a plurality of pieces of vulnerability information of the computer device.

Figure 3:
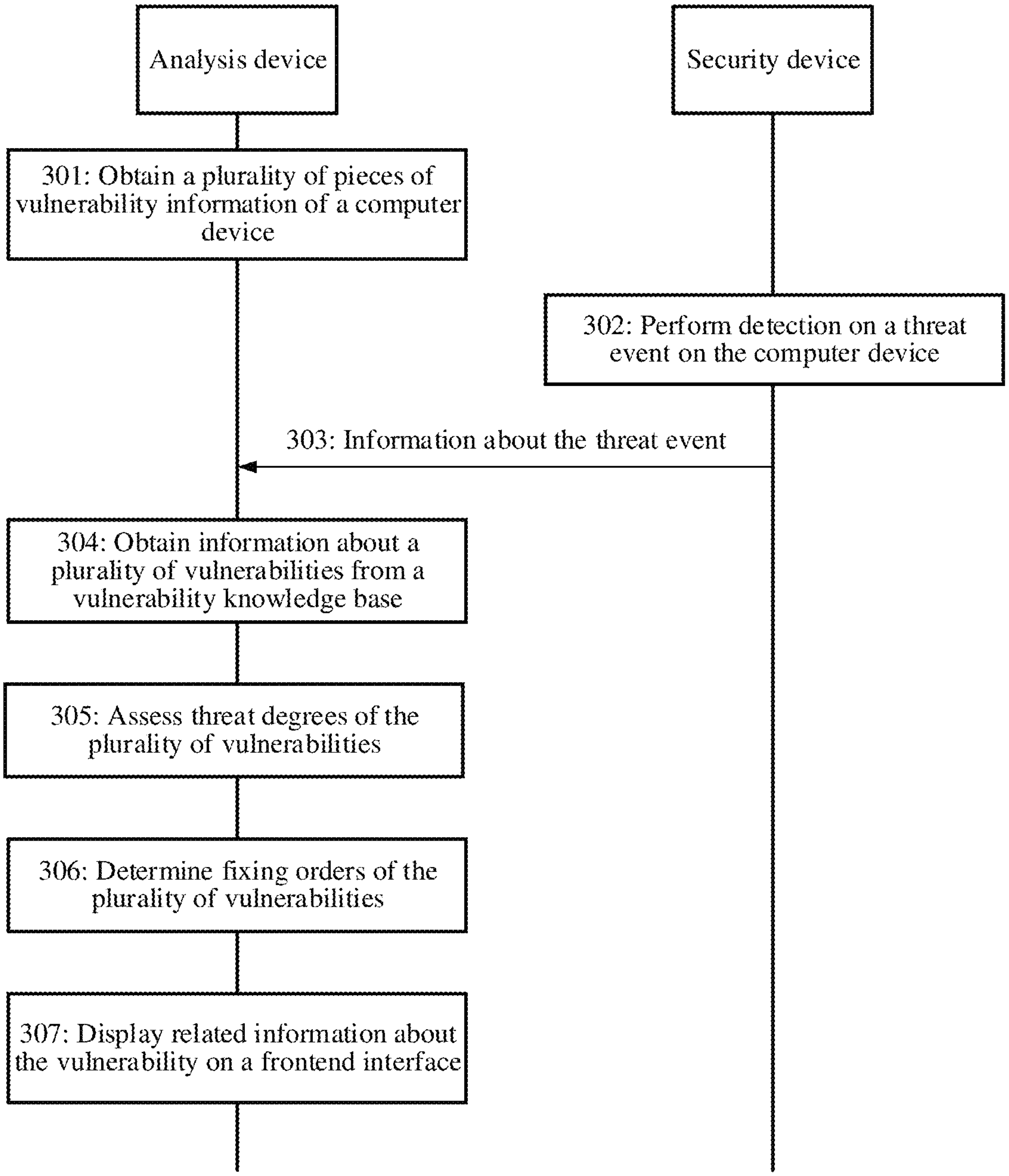
FIG. 3 is a schematic diagram of another embodiment of a vulnerability assessment method according to an example embodiment of this application.

Step 701 in this embodiment is similar to step 301 in the foregoing embodiment shown in FIG. 3. Details are not specifically described herein again.

702: The analysis device sends a test task to the computer device.

The analysis device may test the defense effectiveness of the computer device against the vulnerability by sending the test task to the computer device. The test task is an attack simulation initiated by the analysis device to the computer device based on the vulnerability information. In addition, the test task may alternatively be an instruction that instructs the computer device or another device to perform the attack simulation on the computer device, in other words, the analysis device does not perform the attack simulation. For example, an agent agent is installed on the computer device, the analysis device indicates, by sending the test task, the agent agent to perform a corresponding attack action.

It should be noted that, the test task may not be an attack simulation initiated based on one vulnerability or several vulnerabilities, but is to perform in-depth and comprehensive detection on the computer device by using some test cases. For example, the analysis device performs a penetration test on the computer device, to learn of a vulnerability that the computer device can defend against and a vulnerability that the computer device cannot defend against.

703: The computer device returns a test result to the analysis device.

Figure 8:
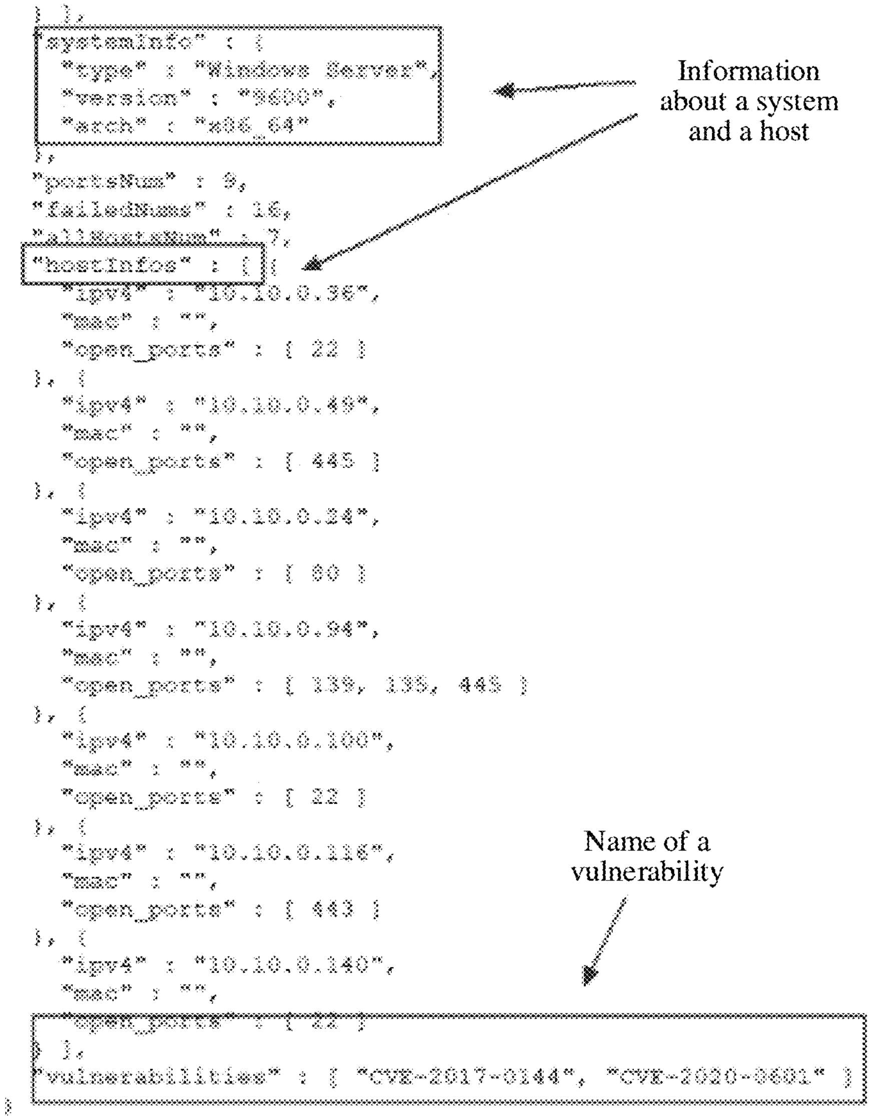
FIG. 8 is a schematic diagram of a test result of defense effectiveness of a computer device according to an example embodiment of this application.

The computer device generates the test result based on the test task, and sends the test result to the analysis device. The analysis device may learn, based on the test result returned by the computer device, whether the attack simulation is successful, in other words, whether the computer device successfully defends against the attack simulation. If the computer device fails to perform defense successfully, it indicates that the computer device does not have a defense capability against the vulnerability corresponding to the test task, in other words, it is not difficult for the attacker to attack the computer device by exploiting the vulnerability (the vulnerability exploitation difficulty is low), and a threat degree of the vulnerability is high. The test result returned by the computer device may be understood with reference to FIG. 8. As shown in FIG. 8, the test result includes a name of the vulnerability used in the test task and information about a system and a host. The test task corresponding to FIG. 8 uses two vulnerabilities "CVE-2017-0144 and CVE-2020-0601" to attack the computer device. It may be understood that FIG. 8 is merely an example for description. During actual application, the test result further displays an execution result of the test task (whether the attack on the computer device succeeds). If the computer device fails to defend against the attack simulation performed by the test task corresponding to FIG. 8, it indicates that the computer device does not have a defense capability against the two vulnerabilities CVE-2017-0144 and CVE-2020-0601.

704: The analysis device obtains information about a plurality of vulnerabilities from a vulnerability knowledge base.

Optionally, the analysis device may further obtain, from the vulnerability knowledge base, other information related to the vulnerability exploitation difficulty.

705: The analysis device assesses threat degrees of the plurality of vulnerabilities.

706: The analysis device determines fixing orders of the plurality of vulnerabilities.

707: The analysis device displays related information about the vulnerability on a frontend interface.

Steps 704 to 707 in this embodiment are similar to steps 304 to 307 in the embodiment shown in FIG. 3, but the vulnerability exploitation difficulty in this embodiment may further include the defense effectiveness of the computer device against the vulnerability, and the analysis device assesses the threat degree of the vulnerability only based on the vulnerability exploitation difficulty. In this embodiment, the information displayed on the frontend interface does not include information about a threat event, but includes the defense effectiveness of the computer device against the vulnerability. The displayed information may be understood with reference to FIG. 9.

In this embodiment, the analysis device may assess the threat degrees of the plurality of vulnerabilities with reference to the defense effectiveness of the computer device against the vulnerability and other vulnerability exploitation difficulty information in the vulnerability knowledge base. This extends an application scenario of the solution, improves implementability of the solution, and further improves assessment accuracy.

Figure 7:
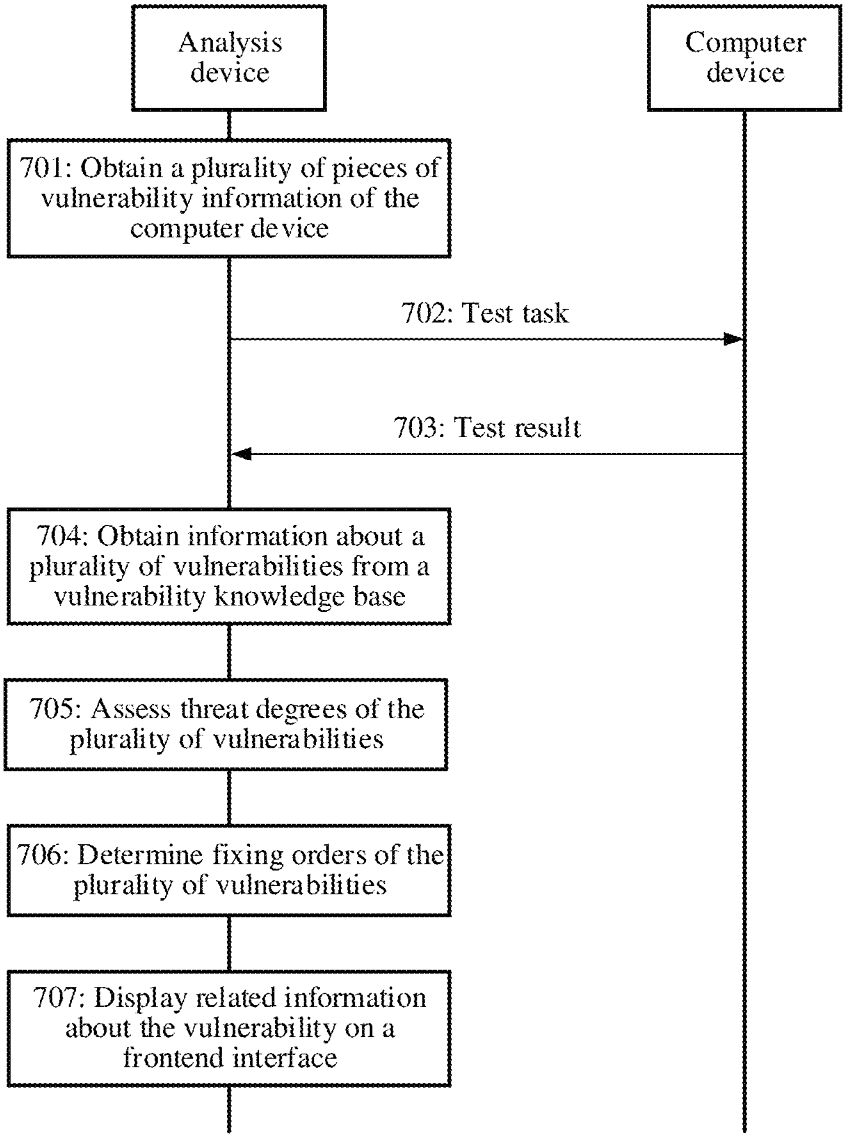
FIG. 7 is a schematic diagram of an embodiment of a vulnerability assessment method according to an example embodiment of this application.

It may be understood that, the analysis device may alternatively assess the threat degree of the vulnerability with reference to the steps in embodiments shown in FIG. 3 and FIG. 7, in other words, assess the threat degree of the vulnerability based on the information about the threat event that is reported by the security device, the defense effectiveness of the computer device against the vulnerability, and the vulnerability information (for example, other vulnerability exploitation difficulty information) obtained from the vulnerability knowledge base.

Figure 10:
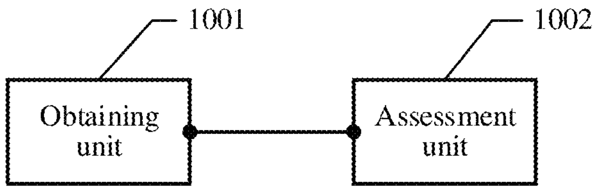
FIG. 10 is a schematic diagram of an embodiment of an analysis device according to an example embodiment of this application.

The foregoing describes the vulnerability assessment method in embodiments of this application, and the following describes the analysis device in embodiments of this application. Refer to FIG. 10. An embodiment of an analysis device in embodiments of this application includes an obtaining unit 1001 and an assessment unit 1002.

The obtaining unit 1001 is configured to obtain a plurality of pieces of vulnerability information. Each piece of vulnerability information in the plurality of pieces of vulnerability information indicates one vulnerability on a computer device, and each piece of vulnerability information includes an identifier of a vulnerability.

The assessment unit 1002 is configured to assess, based on a quantity of threat events that cause an alarm of a security device and/or vulnerability exploitation difficulty, threat degrees of a plurality of vulnerabilities indicated by the plurality of pieces of vulnerability information. The threat event is generated by the security device for an attack sample.

Figure 11:
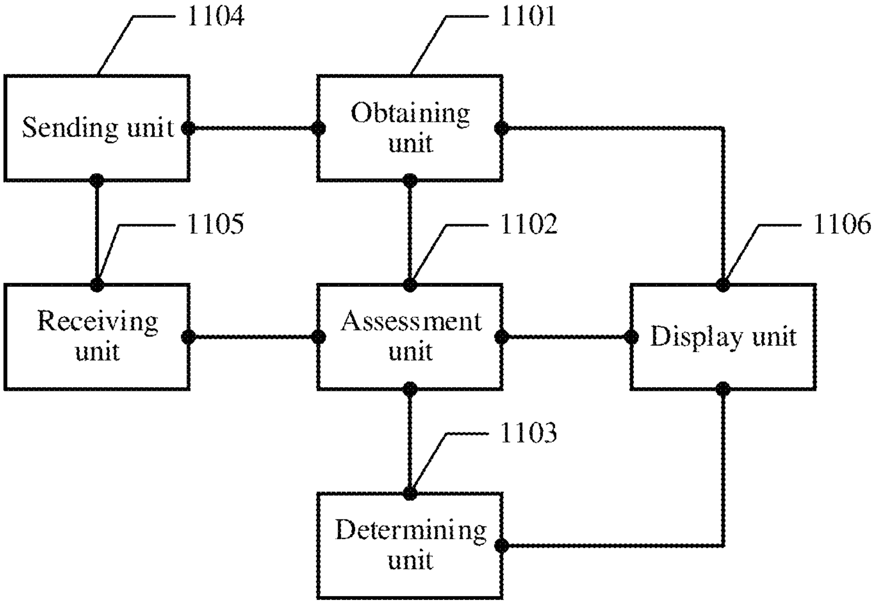
FIG. 11 is a schematic diagram of another embodiment of an analysis device according to an example embodiment of this application.

The following describes in detail the analysis device in embodiments of this application. Refer to FIG. 11. Another embodiment of an analysis device in embodiments of this application includes an obtaining unit 1101 and an assessment unit 1102.

The obtaining unit 1101 is configured to obtain a plurality of pieces of vulnerability information. Each piece of vulnerability information in the plurality of pieces of vulnerability information indicates one vulnerability on a computer device, and each piece of vulnerability information includes an identifier of a vulnerability.

The assessment unit 1102 is configured to assess, based on a quantity of threat events that cause an alarm of a security device and/or vulnerability exploitation difficulty, threat degrees of a plurality of vulnerabilities indicated by the plurality of pieces of vulnerability information. The threat event is generated by the security device for an attack sample.

Optionally, the analysis device further includes a determining unit 1103 that is configured to determine fixing orders of the plurality of vulnerabilities based on the threat degrees of the plurality of vulnerabilities.

The determining unit 1103 is specifically configured to determine handling priorities of the plurality of vulnerabilities based on the threat degrees of the plurality of vulnerabilities, and determine the fixing orders of the plurality of vulnerabilities based on the handling priorities of the plurality of vulnerabilities.

In a possible implementation, the vulnerability exploitation difficulty includes code exploitation maturity or defense effectiveness of the computer device against the vulnerability.

Optionally, the analysis device further includes a sending unit 1104 that is configured to send a test task to the computer device. The test task is for testing the defense effectiveness of the computer device against the vulnerability. The analysis device further includes a receiving unit 1105 that is configured to receive a test result that is of the test task and that is sent by the computer device. The test result indicates the defense effectiveness of the computer device against the vulnerability.

The assessment unit 1102 is further configured to assess the threat degrees of the plurality of vulnerabilities based on a vulnerability assessment model. The vulnerability assessment model is obtained through training based on a plurality of training samples. A first training sample in the plurality of training samples includes a quantity of attack samples that cause the alarm of the security device by exploiting a first vulnerability and/or first vulnerability exploitation difficulty, and a threat degree of the first vulnerability.

Optionally, the analysis device further includes a display unit 1106 that is configured to display the plurality of vulnerabilities and the threat degrees of the plurality of vulnerabilities.

The display unit 1106 is further configured to display the fixing orders of the plurality of vulnerabilities.

In this embodiment, each unit in the analysis device performs the operations of the analysis device in embodiments shown in FIG. 3 and FIG. 7.

Figure 12:
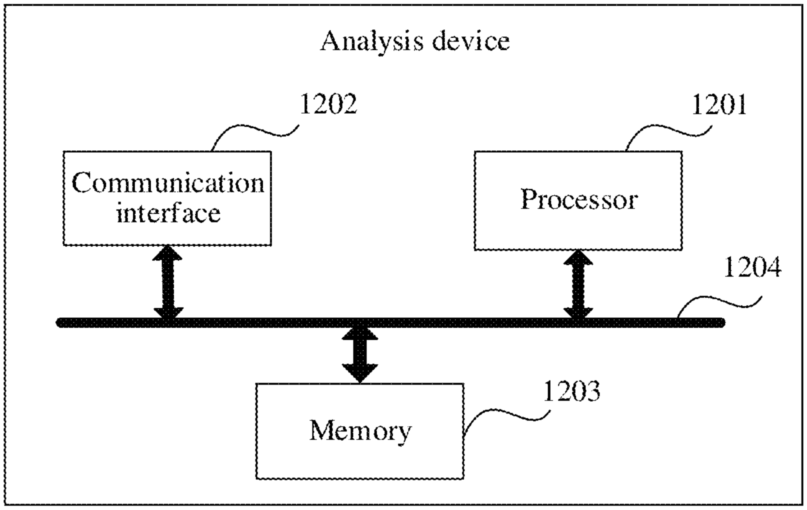
FIG. 12 is a schematic diagram of another embodiment of an analysis device according to an example embodiment of this application.

FIG. 12 is a schematic diagram of a possible logic structure of an analysis device according to an embodiment of this application, including:

a processor 1201, a communication interface 1202, a memory 1203, and a bus 1204. The processor 1201, the communication interface 1202, and the memory 1203 are connected to each other via the bus 1204. In this embodiment of this application, the processor 1201 is configured to control and manage an action of the analysis device. For example, the processor 1201 is configured to perform the steps in the method embodiments in FIG. 2, FIG. 3, and FIG. 7. The communication interface 1202 is configured to support the analysis device in communication. The memory 1203 is configured to store program code and data of the analysis device.

The processor 1201 may be a central processing unit, a general-purpose processor, a digital signal processor, an application-specific integrated circuit, a field programmable gate array or another programmable logic device, a transistor logic device, a hardware component, or any combination thereof. The processor 1201 may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1204 may be a peripheral component interconnect (PCI) bus, an extended industry standard architecture (EISA) bus, or the like. The bus may include an address bus, a data bus, a control bus, or the like. For ease of representation, only one bold line indicates the bus in FIG. 12, but this does not mean that there is only one bus or only one type of bus.

An embodiment of this application further provides a computer-readable and writable storage medium, where the computer-readable and writable storage medium includes instructions. When the instructions are run on a computer, the computer is enabled to perform the methods in embodiments shown in FIG. 2, FIG. 3 and FIG. 7.

An embodiment of this application further provides a computer program product including instructions. When the computer program product runs on a computer, the computer is enabled to perform the methods in embodiments shown in FIG. 2, FIG. 3 and FIG. 7.

An embodiment of this application further provides a chip system. The chip system includes at least one processor and a communication interface. The communication interface is interconnected with the at least one processor through a line. The at least one processor is configured to run a computer program or instructions, to perform the methods in embodiments shown in FIG. 2, FIG. 3, and FIG. 7.

It may be clearly understood by a person skilled in the art that, for convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in another manner. For example, the described apparatus embodiments are merely examples. For example, division into the units is merely logical function division and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. A part of or all of the units may be selected based on actual requirements to achieve the objectives of the solutions of embodiments.

In addition, all functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to a conventional technology, or all or a part of the technical solutions may be implemented in a form of a software product. The computer software product is stored in a storage medium and includes several instructions for instructing a computer device (which may be a personal computer, a server, or a network device) to perform all or some of the steps of the methods in embodiments of this application. The foregoing storage medium includes: any medium that can store program code, such as a universal serial bus (USB) flash drive, a removable hard disk drive, a read-only memory (ROM), a random access memory (RAM), a magnetic disk, or an optical disc.

The invention claimed is:

1. A vulnerability assessment method, comprising:

obtaining, by an analysis device, a plurality of pieces of vulnerability information, wherein each piece of vulnerability information, in the plurality of pieces of vulnerability information, indicates a vulnerability on a computer device, and each piece of vulnerability information comprises an identifier of the vulnerability; and assessing, by the analysis device and based on information about a threat event causing an alarm of a security device and/or vulnerability exploitation difficulty, threat degrees of a plurality of vulnerabilities indicated by the plurality of pieces of vulnerability information, wherein the threat event is an event detected by the security device and includes an attacker attacking the computer device by exploiting the vulnerability of the computer device, and wherein for at least one vulnerability of the plurality of vulnerabilities, the vulnerability exploitation difficulty comprises a defense effectiveness of the computer device against the at least one vulnerability, the method further comprising:

sending, by the analysis device, a test task exploiting the at least one vulnerability to attack, to the computer device, for testing the defense effectiveness of the computer device against the at least one vulnerability; and receiving, by the analysis device, a test result of the test task sent by the computer device, wherein the test result indicates the defense effectiveness of the computer device against the at least one vulnerability.

2. The method according to claim 1, further comprising: determining, by the analysis device, fixing orders, of the plurality of vulnerabilities, based on the threat degrees.

3. The method according to claim 2, wherein determining the fixing orders of the plurality of vulnerabilities comprises:

determining, by the analysis device, handling priorities of the plurality of vulnerabilities based on the threat degrees; and determining, by the analysis device, the fixing orders of the plurality of vulnerabilities based on the handling priorities.

4. The method according to claim 1, wherein the vulnerability exploitation difficulty further includes code exploitation maturity.

5. The method according to claim 1, further comprising:

assessing, by the analysis device, the threat degrees of the plurality of vulnerabilities based on a vulnerability assessment model, wherein the vulnerability assessment model is obtained through training based on a plurality of training samples, a first training sample of the plurality of training samples comprising at least one of: information about a first threat event exploiting a first vulnerability to trigger a security device alarm, difficulty of exploiting the first vulnerability, or a threat degree of the first vulnerability.

6. The method according to claim 1, further comprising: displaying the threat degrees of the plurality of vulnerabilities.

7. The method according to claim 6, further comprising: displaying the fixing orders of the plurality of vulnerabilities.

8. The method according to claim 1, wherein the test task comprises an attack simulation initiated by the analysis device to the computer device based on the plurality of pieces of vulnerability information.

9. The method according to claim 1, wherein the test task comprises an instruction that instructs the computer device or another device to perform an attack simulation on the computer device.

10. An analysis device, comprising:

at least one processor; and at least one memory configured to store computer readable instructions that, when executed by the at least one processor, cause the analysis device to:

obtain a plurality of pieces of vulnerability information, wherein each piece of vulnerability information, in the plurality of pieces of vulnerability information, indicates a vulnerability on a computer device, and each piece of vulnerability information comprises an identifier of the vulnerability; and assess, based on information about a threat event causing an alarm of a security device and/or vulnerability exploitation difficulty, threat degrees of a plurality of vulnerabilities indicated by the plurality of pieces of vulnerability information, wherein the threat event is an event detected by the security device and includes an attacker attacking the computer device by exploiting the vulnerability of the computer device, and wherein for at least one vulnerability of the plurality of vulnerabilities, the vulnerability exploitation difficulty comprises a defense effectiveness of the computer device against the at least one vulnerability, the analysis device is further caused to:

send a test task exploiting the at least one vulnerability to attack, to the computer device, for testing the defense effectiveness of the computer device against the at least one vulnerability; and receive a test result of the test task sent by the computer device, wherein the test result indicates the defense effectiveness of the computer device against the at least one vulnerability.

11. The analysis device according to claim 10, wherein the analysis device is further caused to:

determine fixing orders of the plurality of vulnerabilities based on the threat degrees.

12. The analysis device according to claim 11, wherein the analysis device is further caused to:

determine handling priorities of the plurality of vulnerabilities based on the threat degrees; and determine the fixing orders of the plurality of vulnerabilities based on the handling priorities.

13. The analysis device according to claim 10, wherein the vulnerability exploitation difficulty further includes code exploitation maturity.

14. The analysis device according to claim 10, wherein the analysis device is further caused to:

assess the threat degrees of the plurality of vulnerabilities based on a vulnerability assessment model, wherein the vulnerability assessment model is obtained through training based on a plurality of training samples, a first training sample of the plurality of training samples comprising at least one of: information about a first threat event exploiting a first vulnerability to trigger a security device alarm, difficulty of exploiting the first vulnerability, or a threat degree of the first vulnerability.

15. The analysis device according to claim 10, wherein the analysis device is further caused to:

display the threat degrees of the plurality of vulnerabilities.

16. The analysis device according to claim 15, wherein the analysis device is further caused to:

display the fixing orders of the plurality of vulnerabilities.

17. A non-transitory computer-readable storage medium having computer readable instructions that, when executed by a processor, cause the processor to provide execution comprising:

obtaining a plurality of pieces of vulnerability information, wherein each piece of vulnerability information, in the plurality of pieces of vulnerability information, indicates a vulnerability on a computer device, and each piece of vulnerability information comprises an identifier of the vulnerability; and assessing, based on information about a threat event causing an alarm of a security device and/or vulnerability exploitation difficulty, threat degrees of a plurality of vulnerabilities indicated by the plurality of pieces of vulnerability information, wherein the threat event is an event detected by the security device and includes an attacker attacking the computer device by exploiting the vulnerability of the computer device, and wherein for at least one vulnerability of the plurality of vulnerabilities, the vulnerability exploitation difficulty comprises a defense effectiveness of the computer device against the at least one vulnerability, the processor is further caused to provide execution comprising:

sending a test task exploiting the at least one vulnerability to attack, to the computer device, for testing the defense effectiveness of the computer device against the at least one vulnerability; and receiving a test result of the test task sent by the computer device, wherein the test result indicates the defense effectiveness of the computer device against the at least one vulnerability.

18. The non-transitory computer readable storage medium of claim 17, wherein the processor is further caused to provide execution comprising:

determining fixing orders, of the plurality of vulnerabilities, based on the threat degrees.

19. The non-transitory computer readable storage medium of claim 18, wherein determining the fixing orders of the plurality of vulnerabilities comprises:

determining handling priorities of the plurality of vulnerabilities based on the threat degrees; and determining the fixing orders of the plurality of vulnerabilities based on the handling priorities.

20. The non-transitory computer readable storage medium of claim 17, wherein the vulnerability exploitation difficulty further includes code exploitation maturity.

* * * * *